(12) United States Patent
Matzinger

(10) Patent No.: US 6,172,174 B1
(45) Date of Patent: Jan. 9, 2001

(54) PHENOLIC ROSIN RESIN COMPOSITIONS

(75) Inventor: Michael D. Matzinger, Mt. Pleasant, SC (US)

(73) Assignee: Westvaco Corporation, New York, NY (US)

(*) Notice: Under 35 U.S.C. 154(b), the term of this patent shall be extended for 0 days.

(21) Appl. No.: 09/277,244

(22) Filed: Mar. 26, 1999

Related U.S. Application Data

(63) Continuation-in-part of application No. 09/074,751, filed on May 8, 1998, now Pat. No. 5,969,071.

(51) Int. Cl.$^7$ ............... C08G 8/34; C09F 1/00; C09F 1/02; C09F 1/04
(52) U.S. Cl. ............ 527/602; 530/211; 530/212; 530/214; 530/215; 530/216; 530/218
(58) Field of Search ............... 527/602; 530/24, 530/212, 214, 215, 216, 218

(56) References Cited

U.S. PATENT DOCUMENTS

| | | | |
|---|---|---|---|
| 4,514,540 | 4/1985 | Peck | 524/514 |
| 4,857,624 | 8/1989 | De Blasi et al. | 528/129 |
| 5,021,538 | 6/1991 | Crews | 528/129 |
| 5,427,612 | 6/1995 | Bender | 106/306 |
| 5,698,668 | 12/1997 | Bender | 530/200 |
| 5,708,078 | 1/1998 | Bender et al. | 525/54.27 |

*Primary Examiner*—Nathan M. Nutter
(74) *Attorney, Agent, or Firm*—Daniel B. Reece, IV; Terry B. McDaniel; Richard L. Schmalz

(57) ABSTRACT

This invention relates to novel phenolic rosin resin compositions. In particular, the invention relates to novel phenolic rosin resin compositions and dienophile-modified phenolic rosin resin compositions which exhibit properties that make them useful in formulating vehicles for lithographic printing inks and other coating applications.

20 Claims, No Drawings

PHENOLIC ROSIN RESIN COMPOSITIONS

This application is a continuation-in-part of my commonly assigned, U.S. patent application Ser. No. 09/074,751 filed May 8, 1998, now U.S. Pat. No. 5,969,071, entitled "Method For Preparing Phenolic Rosin Resins."

FIELD OF INVENTION

This invention relates to novel phenolic rosin resin compositions. In particular, the invention relates to novel phenolic rosin resin compositions and dienophile-modified phenolic rosin resin compositions which exhibit properties that make them useful in formulating vehicles for lithographic printing inks and other coating applications.

BACKGROUND OF THE INVENTION

Lithographic inks consist primarily of pigments, natural and/or synthetic resins with high melting points (100° C. to 200° C.), alkyd resins, and hydrocarbon solvents. Low concentrations of plasticizers, antioxidants, chelates, pH modifiers, antiskinning agents, and other additives also are included in lithographic ink formulations.

The natural and synthetic high-melting resins are typically either petroleum-derived or wood-derived. Used solely or in combination, these resins are dissolved in the high-boiling hydrocarbon solvents to give homogenous systems well known in the art as varnishes. Varnishes usually contain 20 to 70% resin solids. The alkyds, plasticizers, antioxidants, etc. are often included in the varnish, so that solids levels may exceed 70%.

It is known to those skilled in the art that in order to prepare phenolic resins, rosin may be reacted with phenols and formaldehyde to give phenol-rosin condensates which contain reactive double bonds and which may be reacted further in Diels-Alder and/or "ene"-addition fashion with alpha, beta-unsaturated carbonyl compounds. These Diels-Alder and ene adducts of phenol-rosin condensates are then esterified with polyols to give broad molecular weight distribution resins with low residual acid numbers. The traditional methods of producing such phenolic rosin resins are well-known. Generally, the rosin is first heated (to around 180° C.) and melted. Thereafter the temperature is reduced (to around 115° C.), phenol and formaldehyde are added, and the mixture is reacted in a phenol-condensate reaction over a period of time (normally around two hours). The resulting product is held under pressure for about two hours, then vented. The temperature is subsequently elevated to about 195° C., maleic anhydride (or the like) is added, and the resulting mixture is maintained at temperature for around an hour and a half. Thereafter a polyol is added to the mixture, the temperature is increased to about 275° C. and maintained for eight to ten hours in order to produce the phenolic rosin resin.

Phenolic resins must meet with several general requirements to be useful as lithographic ink resins. In order to make varnishes, for example, they must be capable of being dissolved in high-boiling hydrocarbon solvents to yield clear varnishes with manageable viscosities for easy workability. The varnishes must be stable in storage to viscosity, color, and clarity changes. On paper, the resin in the varnish or finished ink must dry to yield a durable, smooth, and uniform film with good resistance to abrasion and chemicals.

Moreover, it is appreciated that for phenolic resins to be useful as dispersing resins in lithographic ink pigment processing operations such as flushing, the resins must exhibit several specific properties in addition to the aforementioned requirements general to all lithographic ink resins. For example, when mixed with highly aqueous pigment presscake in high torque dough mixers commonly used for flushing operations, the resins present in the lithographic ink varnish must exhibit excellent pigment wetting properties. Such properties lead to rapid and thorough coverage of pigment particles present in the presscake and to the concurrent displacement of water originally bound to or entrained in the particle aggregates and agglomerates. Good wetting properties also lead to strong adhesion of resin to particle surfaces so that, as aggregates and agglomerates are broken down into primary particle units, resin will coat the particle surfaces thereby providing a steric barrier to particle-particle reaggregation and reagglomeration. Strong adhesion to and thorough coverage of surfaces of primary particle units by resin thus leads to increased color strength, gloss, and transparency, as well as reduced bronzing in the resulting pigment concentrate.

However, major problems exist with the traditional methods of producing phenolic rosin resin compositions. For example, the condensation reactions associated with these methods often result in excessive foaming. Such foaming can lead to spillages and the release of excessive amounts of aldehyde vapors into the atmosphere. While it is a common practice in the industry to employ anti-foaming agents in an attempt to control this problem, the use of such agents adds to the cost of the process. Moreover, these agents often cause printing inks formulated with the resulting phenolic rosin resin compositions to have adhesion problems (which are known in the industry as "fish eyes").

Another problem associated with the production of phenolic rosin resin compositions is that the phenolic condensation reaction temperatures must be maintained above about 110° C. Should the temperatures drop below this level, the rosin can crystallize—thereby forming a gel and rendering the mixture unusable. Yet a further problem associated with traditional production methods is the excessive cycle times caused by the necessity of adding the aldehyde at a controlled rate.

Therefore, an object of this invention is to solve these major problems by disclosing novel phenolic rosin resin compositions that exhibit properties which make them useful in formulating vehicles for lithographic printing inks and other coating applications.

A further object of this invention is to disclose novel dienophile-modified phenolic rosin resin compositions which can be employed in varnishes for use in formulating lithographic printing inks.

SUMMARY OF THE INVENTION

The objects of this invention are met by producing phenolic rosin resin compositions and dienophile-modified phenolic rosin resin compositions which are the reaction products of a method wherein a compound is added to the chemical process which both a) functions as a solvent during the phenolic-rosin condensation reaction, and b) can function as a crosslinker during the esterification reaction. This addition permits the practitioner to conduct the phenolic-rosin condensation reactions at lower temperatures. The ability to lower the reaction temperatures allows one to avoid conventional foaming problems associated with producing phenolic rosin resin compositions, thereby reducing: a) production costs (by eliminating the need for anti-foaming agents and decreasing energy costs), and b) the amount of aldehyde emissions released into the atmosphere.

Moreover, the phenolic rosin resin compositions and dienophile-modified phenolic rosin resin compositions exhibit unique chemical and physical properties well-suited for the production of varnishes for use in formulating printing inks.

DESCRIPTION OF THE PREFERRED EMBODIMENT

The novel phenolic rosin resin compositions are the reaction products produced by:

A) reacting in a condensation reaction:
 1) about 30% to about 95% by total weight of the reactants of a rosin;
 2) about 1% to about 40% by total weight of the reactants of a phenol; and
 3) about 1% to about 25% by total weight of the reactants of an anhydride;

at a temperature in the range of about 80° C. to about 180° C. for a period of time sufficient to produce a phenol-rosin condensate, and the addition of about 2% to about 50% by total weight of the reactants of a crosslinkable compound to the condensation reaction, wherein said crosslinkable compound functions as a solvent during the condensation reaction and is a member selected from the group consisting of polyols, polyamines, ethanolamines, and combinations thereof; and B) reacting in an esterification reaction:
 1) about 85% to about 99% by total weight of the reactants of the phenol-rosin condensate; and
 2) about 1% to about 15% by total weight of the reactants of a crosslinkable compound;

at a temperature in the range of about 190° C. to about 290° C. for a period of time sufficient to produce a phenolic rosin resin composition having an acid number no greater than 35.

Where desired, it is possible to increase the molecular weight of the phenolic rosin resin compositions via an addition reaction in order to produce dienophile-modified phenolic rosin resin compositions which can be utilized to formulate inks with specific desired properties. These novel dienophile-modified phenolic rosin resin compositions are the reaction products produced by:

A) reacting in a condensation reaction:
 1) about 30% to about 95% by total weight of the reactants of a rosin;
 2) about 1% to about 40% by total weight of the reactants of a phenol; and
 3) about 1% to about 25% by total weight of the reactants of an anhydride;

at a temperature in the range of about 80° C. to about 180° C. for a period of time sufficient to produce a phenol-rosin condensate, wherein the improvement comprises the addition of about 2% to about 50% by total weight of the reactants of a crosslinkable compound to the condensation reaction, wherein said crosslinkable compound functions as a solvent during the condensation reaction and is a member selected from the group consisting of polyols, polyamines, ethanolamines, and combinations thereof;

B) reacting in an esterification reaction:
 1) about 85% to about 99% by total weight of the reactants of the phenol-rosin condensate; and
 2) about 1% to about 15% by total weight of the reactants of a crosslinkable compound;

at a temperature in the range of about 190° C. to about 290° C. for a period of time sufficient to produce a phenolic rosin resin composition having an acid number no greater than 35; and C) reacting in an addition reaction:
 1) about 75% to about 99% by total weight of the reactants of the phenolic rosin resin composition; and
 2) about 1% to about 25% by total weight of the reactants of a dienophile;

at a temperature in the range of about 100° C. to about 250° C. for a period of time sufficient to produce a dienophile-modified phenolic rosin resin composition.

It should be noted that the order of reaction of these methods may be varied in order to produce phenolic rosin resin compositions and dienophile-modified phenolic rosin resin compositions with desired characteristics. Such a rotation of the reactions is well-within the ability of one skilled in the art.

The key to the production of these novel phenolic rosin resin compositions (which includes the dienophile-modified embodiments) is the utilization of a crosslinkable compound which has the ability to both: a) function as a solvent at the lower temperatures associated with the phenol-rosin condensation reaction, and b) function as a crosslinker when subjected to the higher temperatures associated with the esterification reaction. Crosslinkable compounds which are suitable for use in producing the phenolic rosin resin compositions should be liquid at the temperature at which the aldehyde is added to the process. Polyols which are suitable for use as crosslinkable compounds in the present method include, but are not limited to, the following: ethylene glycol, diethylene glycol, polyethylene glycol, glycerol, pentaerythritol, dipentaerythritol, sorbitol, and combinations thereof. Polyamines which are suitable crosslinkable compounds include, but are not limited to, the following: hexamethylenediamine, piperazine, 2-methyl-1,5-pentanediamine, 1,3-pentanediamine, 1,2-diaminocyclohexane, bis(hexamethylene)triamine, and combinations thereof. Ethanolamines which are suitable crosslinkable compounds include, but are not limited to, the following: monoethanolamine, diethanolamine, 3-aminobenzyl alcohol, triisopropanolamine, and combinations thereof. It is preferred to add from about 10% to about 20% by total weight of the reactants of a crosslinkable compound to the condensation reaction. It is also preferred to react from about 5% to about 10% by total weight of the reactants of a crosslinkable compound in the esterification reaction.

The period of time needed to produce the phenol-rosin condensate at a temperature of about 80° C. to about 180° C. is commonly in the range of from about 30 minutes to about eight hours (with one to four hours being a normal time period). The preferred temperature range for producing the phenol-rosin condensate is from about 95° C. to about 140° C.

It is known in the art that rosin (which chemically constitutes a mixture of polyunsaturated polycyclic carboxylic acids) may be modified by reaction with acrylic acid, methacrylic acid, fumaric acid and/or maleic anhydride to yield the resulting Diels-Alder cyclo-adducts or "ene" reaction adducts. Rosins which are suitable for use in producing the phenolic rosin resin compositions include, but are not limited to, the following: tall oil rosin, wood rosin, gum rosin, and combinations thereof. It is preferred to react from about 50% to about 80% by total weight of the reactants of a rosin in the condensation reaction.

Phenols which are suitable for use in producing the phenolic rosin resin compositions include, but are not limited to, the following: phenol, nonylphenol, octylphenol, bisphenol A, butyl phenol, and combinations thereof. It is preferred to react from about 5% to about 25% by total weight of the reactants of a phenol in the condensation reaction.

Aldehydes which are suitable for use in producing the phenolic rosin resin compositions include, but are not limited to, the following: paraformaldehyde, formaldehyde, and combinations thereof. It is preferred to react from about 5% to about 15% by total weight of the reactants of an aldehyde in the condensation reaction.

Where desired, a catalyst may be employed in the phenol-rosin condensate reaction. Suitable catalysts include alkali metal hydroxides, alkali metal oxides, and the like. Where employed, it is preferred to use an amount of catalyst in the range of from about 0.01% to about 5.00% by total weight of reactants.

The period of time needed to produce the phenolic rosin resin compositions at a temperature of about 190° C. to about 290° C. is usually in the range of from about one hour to about eight hours. The preferred temperature range for the esterification reaction is from about 220° C. to about 265° C. It is further preferred to produce phenolic rosin resin compositions which exhibit an acid number no greater than 25.

Dienophiles which are suitable for use in the addition reaction include alpha, beta unsaturated carbonyl compounds and the like. Specific dienophiles which are suitable for use in producing the dienophile-modified phenolic rosin resin compositions include, but are not limited to, the following: maleic anhydride, fumaric acid, itaconic acid, itaconic anhydride, acrylic acid, crotonic acid, the alkyd esters of these compounds, and combinations thereof. It is preferred to react from about 85% to about 95% by total weight of the reactants of the phenolic rosin resin composition and from about 5% to about 15% by total weight of the reactants of a dienophile in the addition reaction.

The period of time needed to produce the dienophile-modified phenolic rosin resin compositions at a temperature of about 100° C. to about 250° C. is usually in the range of from about fifteen minutes to about three hours (with about 45 to 90 minutes being a normal time period). The preferred temperature range for the addition reaction is from about 180° C. to about 240° C.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

Into a flask equipped with an overhead stirrer, condenser, Dean Stark trap, thermocouple, nitrogen delivery system, and heating mantle, was charged 1000 grams of Rosin SS (a tall oil rosin commercially available from Westvaco Corporation) and 70 grams of glycerine. The contents were heated to a temperature of 100° C. and 370 grams of nonylphenol, 60 grams of bisphenol A, 30 grams of t-butyl phenol, and 12 grams of magnesium oxide were added. Thereafter 136 grams of paraformaldehyde were added over a ten minute period. The temperature was maintained at 100° C. for 30 minutes; after which the temperature was increased to 120° C. and maintained for two hours. The temperature was subsequently increased to 220° C. and water was collected. Thereafter 10 grams of pentaerythritol were added, the temperature was increased to 240° C. and maintained for five hours. The resulting phenolic rosin ester composition (hereafter referred to as Composition A) had an acid number of 26 and a ring and ball softening point of 166° C.

Varnishes were produced using 33 wt. % of Composition A in 77 wt. % of alkaline refined linseed oil (ARLO). The varnishes had a viscosity of 1200 line-to-line seconds and a dilutability with Magesol M-47 oil (a hydrocarbon solvent commercially available from Magie Bros. Oil Co.) of 200%.

EXAMPLE 2

For evaluation purposes an attempt was made to produce a rosin resin using the procedure taught in example 1 above, except that no liquid polyol solvent (i.e., glycerine) was employed.

Into a flask equipped with an overhead stirrer, condenser, Dean Stark trap, thermocouple, nitrogen delivery system, and heating mantle, was charged 1000 grams of Rosin SS (a tall oil rosin commercially available from Westvaco Corporation) and 70 grams of glycerine. The contents were heated to a temperature of 100° C. and 370 grams of nonylphenol, 60 grams of bisphenol A, 30 grams of t-butyl phenol, and 12 grams of magnesium oxide were added. Thereafter 136 grams of paraformaldehyde were added over a ten minute period. The temperature was maintained at 100° C. for 30 minutes; after which the temperature was increased to 120° C. and maintained for two hours. The temperature was subsequently increased to 220° C. and water was collected. At this point, the resin "gelled" and the synthesis was aborted.

EXAMPLE 3

Into a flask equipped with an overhead stirrer, condenser, Dean Stark trap, thermocouple, nitrogen delivery system, and heating mantle, was charged 1000 grams of Rosin SS (a tall oil rosin commercially available from Westvaco Corporation), 57.5 grams of glycerine, 381.1 grams of nonylphenol, and 75 grams of bisphenol A. The contents were heated to a temperature of 115° C. and 12 grams of magnesium oxide were added. Thereafter 136 grams of paraformaldehyde were added over a ten minute period. The temperature was maintained at 104° C. for 30 minutes; after which the temperature was increased to 113° C. and maintained for two hours. The temperature was subsequently increased to 200° C. and water was collected. Thereafter 21 grams of pentaerythritol were added, the temperature was increased to 240° C. and maintained for eight hours. The resulting phenolic rosin ester composition (hereafter referred to as Composition B) had an acid number of 30 and a ring and ball softening point of 148° C.

Varnishes were produced using 33 wt. % of Composition B in 77 wt. % of alkaline refined linseed oil (ARLO). The varnishes had a viscosity of 55 line-to-line seconds and a dilutability with Magesol M-47 oil (a hydrocarbon solvent commercially available from Magie Bros. Oil Co.) of 1136%.

EXAMPLE 4

Into a flask equipped with an overhead stirrer, condenser, Dean Stark trap, thermocouple, nitrogen delivery system, and heating mantle, was charged 1000 grams of Rosin SS (a tall oil rosin commercially available from Westvaco Corporation), 51 grams of L-5 Fatty Acid (a tall oil-based fatty acid commercially available from Westvaco Corporation), 57.5 grams of glycerine, 381.1 grams of nonylphenol, and 75 grams of bisphenol A. The contents were heated to a temperature of 115° C. and 12 grams of magnesium oxide were added. Thereafter the temperature was decreased to 105° C. and 136 grams of paraformaldehyde were added over a ten minute period. The temperature was maintained at 104° C. for 30 minutes; after which the temperature was increased to 113° C. and maintained for two hours. The temperature was subsequently increased to 203° C. and water was collected. Thereafter 21 grams of pentaerythritol were added, the temperature was increased to 240° C. and maintained for eight hours. The resulting phenolic rosin ester composition (hereafter referred to as Composition C) had an acid number of 26 and a ring and ball softening point of 135° C.

Varnishes were produced using 33 wt. % of Composition A in 77 wt. % of alkaline refined linseed oil (ARLO). The varnishes had a viscosity of 69 line-to-line seconds and a dilutability with Magesol M-47 oil (a hydrocarbon solvent commercially available from Magie Bros. Oil Co.) of 1514%.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A phenolic rosin resin composition, wherein said composition comprises the reaction products produced by:
   A) reacting in a condensation reaction:
      1) about 30% to about 95% by total weight of the reactants of a rosin;
      2) about 1% to about 40% by total weight of the reactants of a phenol; and
      3) about 1% to about 25% by total weight of the reactants of an anhydride;
   at a temperature in the range of about 80° C. to about 180° C. for a period of time sufficient to produce a phenol-rosin condensate, and the addition to the condensation reaction of about 2% to about 50% by total weight of the reactants of a crosslinkable compound which is a member selected from the group consisting of polyols, polyamines, ethanolamines, and combinations thereof, wherein said crosslinkable compound functions as a solvent during the condensation reaction; and
   B) reacting in an esterification reaction:
      1) about 85% to about 99% by total weight of the reactants of the phenol-rosin condensate; and
      2) about 1% to about 15% by total weight of the reactants of a crosslinkable compound which is a member selected from the group consisting of polyols, polyamines, ethanolamines, and combinations thereof;
   at a temperature in the range of about 190° C. to about 290° C. for a period of time sufficient to produce a phenolic rosin resin composition having an acid number no greater than 35.

2. The phenolic rosin resin composition of claim 1 which comprises the reaction products produced by:
   A) reacting in a condensation reaction:
      1) about 50% to about 80% by total weight of the reactants of a rosin;
      2) about 5% to about 25% by total weight of the reactants of a phenol; and
      3) about 5% to about 15% by total weight of the reactants of an anhydride;
   at a temperature in the range of about 80° C. to about 180° C. for a period of time sufficient to produce a phenol-rosin condensate, and the addition to the condensation reaction of about 10% to about 20% by total weight of the reactants of a crosslinkable compound which is a member selected from the group consisting of polyols, polyamines, ethanolamines, and combinations thereof, wherein said crosslinkable compound functions as a solvent during the condensation reaction;
   B) reacting in an esterification reaction:
      1) about 90% to about 95% by total weight of the reactants of the phenol-rosin condensate; and
      2) about 5% to about 10% by total weight of the reactants of a crosslinkable compound which is a member selected from the group consisting of polyols, polyamines, ethanolamines, and combinations thereof;
   at a temperature in the range of about 190° C. to about 290° C. for a period of time sufficient to produce a phenolic rosin resin composition having an acid number no greater than 35.

3. The phenolic rosin resin composition of claim 1 wherein the rosin is a member selected from the group consisting of tall oil rosin, wood rosin, gum rosin, and combinations thereof.

4. The phenolic rosin resin composition of claim 1 wherein the phenol is a member selected from the group consisting of phenol, nonylphenol, octylphenol, bisphenol A, butyl phenol, and combinations thereof.

5. The phenolic rosin resin composition of claim 1 wherein the anhydride is a member selected from the group consisting of paraformaldehyde, formaldehyde, and combinations thereof.

6. The phenolic rosin resin composition of claim 1 wherein the crosslinking compound is a member selected from the group consisting of ethylene glycol, diethylene glycol, polyethylene glycol, glycerol, pentaerythritol, dipentaerythritol, sorbitol, hexamethylenediamine, piperazine, 2-methyl-1,5-pentanediamine, 1,3-pentanediamine, 1,2-diaminocyclohexane, bis(hexamethylene)triamine, monoethanolamine, diethanolamine, 3-aminobenzyl alcohol, triisopropanolamine, and combinations thereof.

7. The phenolic rosin resin composition of claim 1 which further comprises adding from about 0.01% to about 5.00% by total weight of the reactants of a catalyst to the condensation reaction.

8. The phenolic rosin resin composition of claim 1 wherein the composition has an acid number no greater than 25.

9. A varnish for lithographic ink formulations comprising the phenolic rosin resin composition of claim 1 dissolved in hydrocarbon solvent.

10. A dienophile-modified phenolic rosin resin composition, wherein said composition comprises the reaction products produced by:
    A) reacting in a condensation reaction:
       1) about 30% to about 95% by total weight of the reactants of a rosin;
       2) about 1% to about 40% by total weight of the reactants of a phenol; and
       3) about 1% to about 25% by total weight of the reactants of an anhydride;
    at a temperature in the range of about 80° C. to about 180° C. for a period of time sufficient to produce a phenol-rosin condensate, and the addition to the condensation reaction of about 2% to about 50% by total weight of the reactants of a crosslinkable compound which is a member selected from the group consisting of polyols, polyamines, ethanolamines, and combinations thereof, wherein said crosslinkable compound functions as a solvent during the condensation reaction; and B) reacting in an esterification reaction:
1) about 85% to about 99% by total weight of the reactants of the phenol-rosin condensate; and
2) about 1% to about 15% by total weight of the reactants of a crosslinkable compound which is a member selected from the group consisting of polyols, polyamines, ethanolamines, and combinations thereof;

at a temperature in the range of about 190° C. to about 290° C. for a period of time sufficient to produce a phenolic rosin resin composition having an acid number no greater than 35; and C) reacting in an addition reaction:
1) about 75% to about 99% by total weight of the reactants of the phenolic rosin resin composition; and
2) about 1% to about 25% by total weight of the reactants of a dienophile;

at a temperature in the range of about 100° C. to about 250° C. for a period of time sufficient to produce the dienophile-modified phenolic rosin resin composition.

11. The phenolic rosin resin composition of claim 10 which comprises the reaction products produced by:

A) reacting in a condensation reaction:
1) about 50% to about 80% by total weight of the reactants of a rosin;
2) about 5% to about 25% by total weight of the reactants of a phenol; and
3) about 5% to about 15% by total weight of the reactants of an anhydride;

at a temperature in the range of about 80° C. to about 180° C. for a period of time sufficient to produce a phenol-rosin condensate, and the addition to the condensation reaction of about 10% to about 20% by total weight of the reactants of a crosslinkable compound which is a member selected from the group consisting of polyols, polyamines, ethanolamines, and combinations thereof, wherein said crosslinkable compound functions as a solvent during the condensation reaction;

B) reacting in an esterification reaction:
1) about 90% to about 95% by total weight of the reactants of the phenol-rosin condensate; and
2) about 5% to about 10% by total weight of the reactants of a crosslinkable compound which is a member selected from the group consisting of polyols, polyamines, ethanolamines, and combinations thereof;

at a temperature in the range of about 190° C. to about 290° C. for a period of time sufficient to produce a phenolic rosin resin composition having an acid number no greater than 35; and C) reacting in an addition reaction:
1) about 85% to about 95% by total weight of the reactants of the phenolic rosin resin composition; and
2) about 5% to about 15% by total weight of the reactants of a dienophile;

at a temperature in the range of about 100° C. to about 250° C. for a period of time sufficient to produce the dienophile-modified phenolic rosin resin composition.

12. The dienophile-modified phenolic rosin resin composition of claim 10 wherein the rosin is a member selected from the group consisting of tall oil rosin, wood rosin, gum rosin, and combinations thereof.

13. The dienophile-modified phenolic rosin resin composition of claim 10 wherein the phenol is a member selected from the group consisting of phenol, nonylphenol, octylphenol, bisphenol A, butyl phenol, and combinations thereof.

14. The dienophile-modified phenolic rosin resin composition of claim 10 wherein the anhydride is a member selected from the group consisting of paraformaldehyde, formaldehyde, and combinations thereof.

15. The dienophile-modified phenolic rosin resin composition of claim 10 wherein the crosslinking compound is a member selected from the group consisting of ethylene glycol, diethylene glycol, polyethylene glycol, glycerol, pentaerythritol, dipentaerythritol, sorbitol, hexamethylenediamine, piperazine, 2-methyl-1,5-pentanediamine, 1,3-pentanediamine, 1,2-diaminocyclohexane, bis(hexamethylene)triamine, monoethanolamine, diethanolamine, 3-aminobenzyl alcohol, triisopropanolamine, and combinations thereof.

16. The dienophile-modified phenolic rosin resin composition of claim 10 which further comprises adding from about 0.01% to about 5.00% by total weight of the reactants of a catalyst to the condensation reaction.

17. The dienophile-modified phenolic rosin resin composition of claim 10 wherein the composition has an acid number no greater than 25.

18. The dienophile-modified phenolic rosin resin composition of claim 10 wherein the dienophile is a member selected from the group consisting of alpha, beta unsaturated carbonyl compounds and combinations thereof.

19. The dienophile-modified phenolic rosin resin composition of claim 11 wherein the dienophile is a member selected from the group consisting of maleic anhydride, fumaric acid, itaconic acid, itaconic anhydride, acrylic acid, crotonic acid, the alkyd esters of these compounds, and combinations thereof.

20. A varnish for lithographic ink formulations comprising the phenolic rosin resin composition of claim 10 dissolved in hydrocarbon solvent.

* * * * *